US010047933B2

(12) United States Patent
Zhang et al.

(10) Patent No.: US 10,047,933 B2
(45) Date of Patent: Aug. 14, 2018

(54) ELASTICALLY DEFORMABLE FRAME WITH ARC-SHAPED STRUCTURES AND BACKLIGHT SOURCE COMPRISING THE SAME

(71) Applicants: BOE Technology Group Co., Ltd., Beijing (CN); Hefei BOE Display Lighting Co., Ltd., Anhui (CN)

(72) Inventors: Qiping Zhang, Beijing (CN); Wenbo Sun, Beijing (CN); Yanfeng Li, Beijing (CN); Tongmin Liu, Beijing (CN); Xing Wang, Beijing (CN); Yang Yang, Beijing (CN)

(73) Assignees: BOE TECHNOLOGY GROUP CO., LTD., Beijing (CN); HEFEI BOE DISPLAY LIGHTING CO., LTD., Anhui (CN)

( * ) Notice: Subject to any disclaimer, the term of this patent is extended or adjusted under 35 U.S.C. 154(b) by 0 days.

(21) Appl. No.: 15/512,096

(22) PCT Filed: Mar. 10, 2016

(86) PCT No.: PCT/CN2016/076055

§ 371 (c)(1),
(2) Date: Mar. 17, 2017

(87) PCT Pub. No.: WO2017/041462

PCT Pub. Date: Mar. 16, 2017

(65) Prior Publication Data

US 2017/0276328 A1 Sep. 28, 2017

(30) Foreign Application Priority Data

Sep. 11, 2015 (CN) ..................... 2015 2 0709380 U

(51) Int. Cl.
*G02F 1/1333* (2006.01)
*F21V 17/16* (2006.01)
(Continued)

(52) U.S. Cl.
CPC ............ *F21V 17/164* (2013.01); *F21V 17/08* (2013.01); *G02F 1/1333* (2013.01); *F21S 8/00* (2013.01)

(58) Field of Classification Search
CPC ... G02F 2001/133314; G02F 1/133308; G02F 1/133608; G02F 2001/133328; G02F 2201/46; G02F 1/1333; G02B 6/0081
See application file for complete search history.

(56) References Cited

U.S. PATENT DOCUMENTS 9,261,720 B2 2/2016 Lee et al.
9,323,084 B2 4/2016 Lee et al.
(Continued)

FOREIGN PATENT DOCUMENTS

CN 101140379 A 3/2008
CN 102376213 A 3/2012
(Continued)

OTHER PUBLICATIONS

International Search Report (English translation) and Written Opinion of International Application No. PCT/CN2016/076055, dated Jun. 12, 2016, 10 pages.
(Continued)

*Primary Examiner* — Huyen Ngo
(74) *Attorney, Agent, or Firm* — Westman, Champlin & Koehler, P.A.

(57) ABSTRACT

The present disclosure discloses a frame for fixating a component of a backlight source to a rectangular back plate. A long border of the frame has a first arc-shaped structure configured such that a central position of the long border is bent inwards relative to two ends of the long border. Each short border of the frame has a second arc-shaped structure configured such that two ends of the each short border are bent inwards relative to a central position of the each short border. First connection members for engagement with the back plate are disposed at the central position of the long border, and positions, close to the two ends, of the long border, respectively, and second connection members for engagement with the back plate are disposed at the central position of each short border, and positions, close to the two ends, of the each short border, respectively.

10 Claims, 3 Drawing Sheets

(51) Int. Cl.
*F21V 17/08* (2006.01)
*F21S 8/00* (2006.01)

(56) References Cited

U.S. PATENT DOCUMENTS

| | | | | |
|---|---|---|---|---|
| 9,781,847 | B2 * | 10/2017 | Sun | H05K 5/0017 |
| 2009/0009684 | A1 * | 1/2009 | Hsiao | G02F 1/133608 349/58 |
| 2015/0309354 | A1 * | 10/2015 | Li | G02B 6/0088 349/60 |
| 2017/0153501 | A1 * | 6/2017 | Li | G02F 1/133608 |

FOREIGN PATENT DOCUMENTS

| | | | |
|---|---|---|---|
| CN | 103809307 | A | 5/2014 |
| CN | 204437742 | U | 7/2015 |
| CN | 204883128 | U | 12/2015 |
| JP | 4368265 | B2 | 9/2009 |

OTHER PUBLICATIONS

English translation of Box No. V of the Written Opinion for the International Searching Authority for International Application No. PCT/CN2016/076055, 1 page.

English translation of International Search Report and Written Opinion for International Application No. PCT/CN2016/076055, dated Jun. 12, 2016, 8 pages.

* cited by examiner

ELASTICALLY DEFORMABLE FRAME WITH ARC-SHAPED STRUCTURES AND BACKLIGHT SOURCE COMPRISING THE SAME

CROSS-REFERENCE TO RELATED APPLICATIONS

This application is a Section 371 National Stage Application of International Application No. PCT/CN2016/076055, filed on 10 Mar. 2016, entitled "FRAME AND BACKLIGHT SOURCE COMPRISING THE SAME", which has not yet published, which claims priority to Chinese Application No. 201520709380.6, filed on 11 Sep. 2015, incorporated herein by reference in their entirety.

BACKGROUND

1. Technical Field

The present disclosure relates to the field of display technology, and particularly to a frame and a backlight source comprising the frame.

2. Description of the Related Art

A backlight source (Back Light) is a light source located at a back of a liquid crystal display (LCD). With trend of developments of thinning and high screen ratio of liquid crystal display products, market requirements for display effect of the display products are increasingly high. This means that the quality of the backlight source must be further improved.

FIG. 1 is a partial sectional view of an existing backlight source. As shown in FIG. 1, the backlight source comprises a back plate 1, a frame (for example a plastic frame) 2, a reflector plate 3, a light guide plate 4, and an optical film 5. In a process of assembling the backlight source, the reflector plate 3 is first assembled in an inner chamber of the back plate 1, the light guide plate 4 is then assembled on the reflector plate 4 by means of a fixing adhesive tape, and the back plate 1 and the frame 2 are next combined together by means of a plurality of engagement points (as shown in a circular region in FIG. 1) between the back plate 1 and the frame 2. The frame 2 has a boss 6 disposed at an edge of the light guide plate 4 and configured to fix the light guide plate 4 onto the reflector plate 3.

The abovementioned backlight source unavoidably has the following problems in practical application.

Firstly, the number of the engagement points between the back plate 1 and the frame 2 is large (generally around 13-15), so that assembling and disassembling processes are very fussy, time consuming, and strenuous, thereby resulting in a low assembly efficiency. Furthermore, the frame 2 has a small thickness, and material of the back plate 1 is soft (for example A1). Hence, in the assembling and disassembling processes, the engagement points of which the number is large will easily result in deformations of the back plate 1 and the frame 2 to damage the backlight source. In addition, since the number of the engagement points is large, failure of engagement or disengagement will easily occur so that a planar bearing surface on the frame 1 will locally protrude. After completing assembling of a display screen, the glass screen will be easily caused to be locally broken, thereby reducing a yield.

Secondly, in a process of forming molds of the frame 2 and the back plate 1, the greater the number of the engagement points between the frame 2 and the back plate 1 is, the greater complicated structures of the molds are. Therefore, processing difficulty of the frame 2 and the back plate 1 in the prior art is high, thereby increasing manufacturing cost of the backlight source.

SUMMARY

An object of the present disclosure is to provide a frame and a backlight source comprising the frame. Thereby a structure of the frame can be simplified and its assembly time and disassembly time can be saved. As a result, not only assembly efficiency can be improved while processing difficulty can be decreased, but also a glass screen can be effectively prevented from being locally broken due to failure of engagement or disengagement.

The present disclosure provides a frame for fixation of a corresponding component of a backlight source to a rectangular back plate. The frame comprises a long border and two short borders corresponding respectively to a long side and two short sides of the rectangular back plate; the long border has a first arc-shaped structure configured such that a central position of the long border is bent inwards relative to two ends of the long border; each of the short borders has a second arc-shaped structure configured such that two ends of the each of the short borders are bent inwards relative to a central position of the each of the short borders; and first connection members for engagement with the rectangular back plate are disposed at the central position, and positions, close to the two ends, of the long border, and at the central position, and positions, close to the two ends, of each of the short borders, respectively.

In accordance with embodiments of the present disclosure, the first arc-shaped structure of the long border is symmetrical about a center of the long border.

In accordance with embodiments of the present disclosure, the second arc-shaped structure of the short border is divided into a middle segment being in a straight-line shape, and edge segments located on two sides of the middle segment and bent inwards relative to the middle segment.

In accordance with embodiments of the present disclosure, the second arc-shaped structure of the short border is symmetrical about a center of the short border.

In accordance with embodiments of the present disclosure, an included angle formed between the middle segment and the inwards bent edge segment is 170-175 degrees.

In accordance with embodiments of the present disclosure, an included angle formed at the inwards bent central position of the long border is 160-170 degrees.

In accordance with embodiments of the present disclosure, three, on the long border, of the first connection members are distributed uniformly in a length direction of the long border; and three, on each of the short borders, of the first connection members are distributed uniformly in a length direction of the each of the short borders.

In accordance with embodiments of the present disclosure, a boss is disposed on each of the long border and the two short borders for fixation of the component of the backlight source.

The present disclosure also provides a backlight source comprising: a rectangular back plate and a frame for fixation of a component of the backlight source to the rectangular back plate. The abovementioned frame provided by the present disclosure is used as the frame here.

In accordance with embodiments of the present disclosure, the component of the backlight source comprises a reflector plate, a light guide plate and an optical film disposed in sequence in an inner chamber of the rectangular back plate.

BRIEF DESCRIPTION OF THE DRAWINGS

The drawings are used to provide further understanding of the present disclosure and constitute a part of the description. The disclosure are explained by means of the drawings together with the following embodiments but should not be construed as being limited to the drawings and embodiments.

DETAILED DESCRIPTION OF THE EMBODIMENTS

Embodiments of the present disclosure will be described in detail as below in combination with the accompanying drawings. It should be understood that the embodiments set forth herein are only used to describe and explain the disclosure and the disclosure is not limited to the embodiments.

Figure 1:
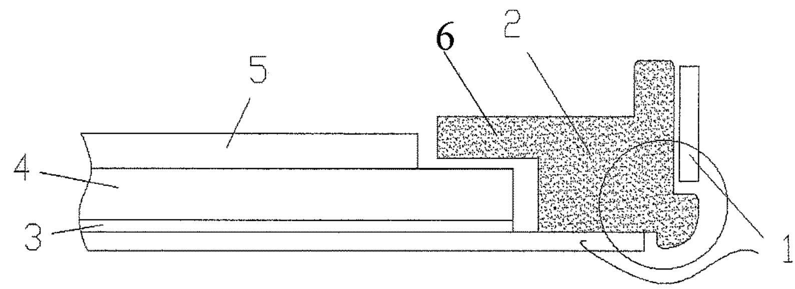
FIG. 1 is a partial sectional view of an existing backlight source.
Figure 2:
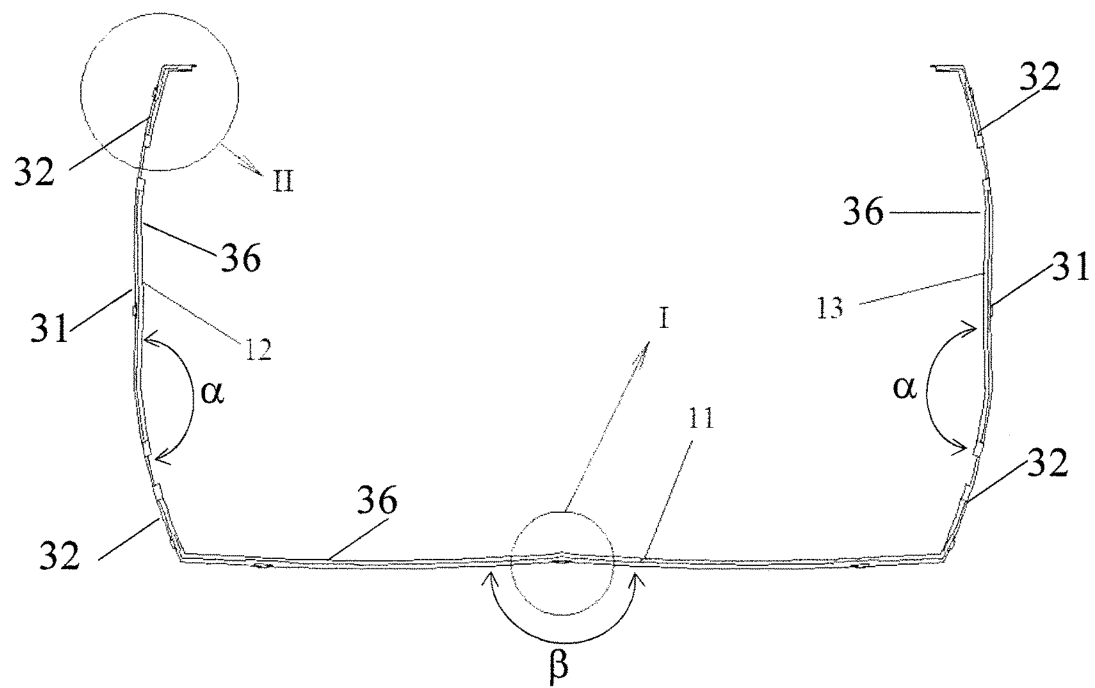
FIG. 2 is a schematic view showing structure of a frame provided by an embodiment of the present disclosure.
Figure 3:
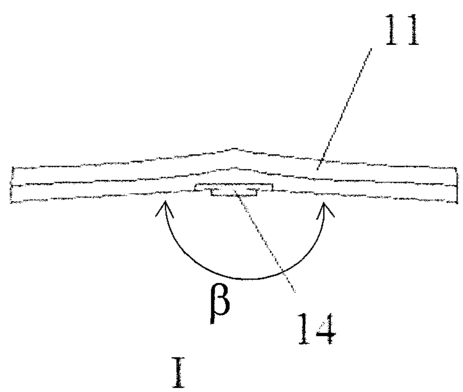
FIG. 3 is an enlarged view of region I in FIG. 2.
Figure 4:
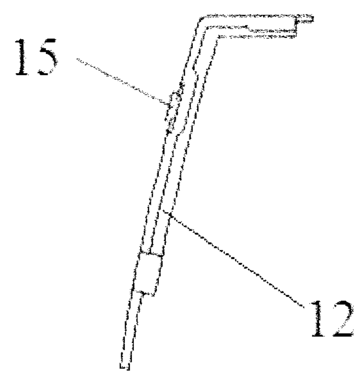
FIG. 4 is an enlarged view of region II in FIG. 2.

FIG. 2 is a schematic view showing a structure of a frame provided by an embodiment of the present disclosure. FIG. 3 is an enlarged view of region I in FIG. 2. FIG. 4 is an enlarged view of region II in FIG. 2. Please refer to FIG. 2 to FIG. 4, a frame provided by the present disclosure is configured for fixation of a component (for example including a reflector plate, a light guide plate and an optical film) of a backlight source to a rectangular back plate. The frame comprises a long border 11 and short borders 12, 13 located on two sides of the long border 11. The long border 11 and the two short borders 12, 13 correspond to a long side and two short sides of the rectangular back plate, respectively. Further, the long border 11 has a first arc-shaped structure. The first arc-shaped structure is configured such that a central position of the long border 11 is bent inwards relative to two ends of the long border 11. Each of the short borders has a second arc-shaped structure. The second arc-shaped structure is configured such that two ends of the short border are bent inwards relative to a central position of the short border. Further, as shown in FIG. 3, first connection members 14 are disposed at the central position, and positions, close to the two ends, of the long border 11, respectively. The first connection members 14 are configured for engagement with the rectangular back plate. Likewise, as shown in FIG. 4, first connection members 15 are disposed at the central position, and positions, close to the two ends, of each of the short borders 12, 13, respectively. The first connection members 15 are configured for engagement with the rectangular back plate.

Figure 5:
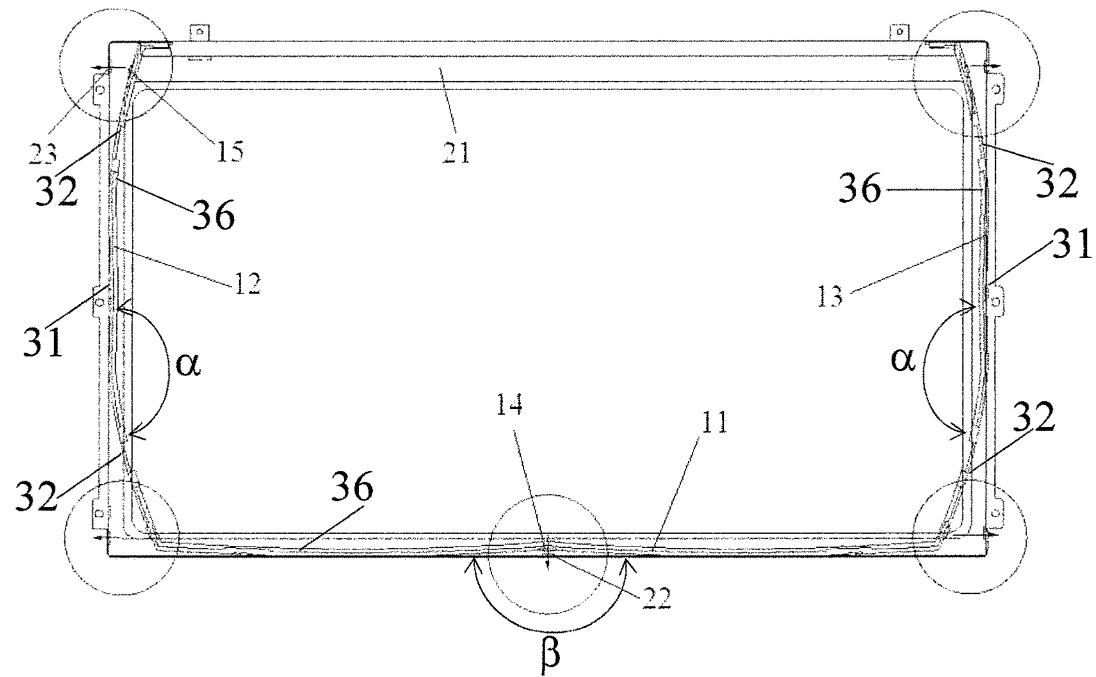
FIG. 5 is a schematic view of the frame provided by the embodiment of the present disclosure, before engagement of the frame with a back plate.
Figure 6:
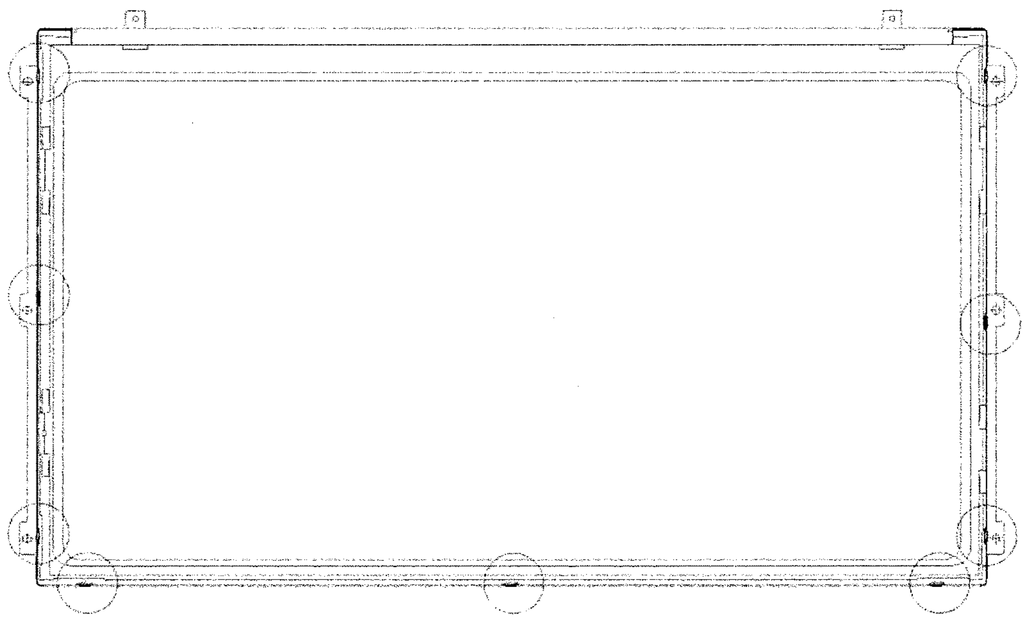
FIG. 6 is a schematic view of the frame provided by the embodiment of the present disclosure, after engagement of the frame with the back plate.

FIG. 5 is a schematic view of the frame provided by the embodiment of the present disclosure, before engagement of the frame with a back plate. FIG. 6 is a schematic view of the frame provided by the embodiment of the disclosure, after engagement of the frame with the back plate. Please refer to both FIG. 5 and FIG. 6, before engagement of the frame with the back plate 21, the central position of the long border 11 is bent inwards relative to the two ends of the long border 11 so that there is a gap between the central position of the long border 11 and the back plate 21. However, as shown in FIG. 5, since the central position of the long border 11 is bent inwards relative to the two ends of the long border 11, two side portions of the long border 11 fit in with the back plate 21. Meanwhile, as shown in FIG. 5, the two ends of the short border are bent inwards relative to the central position of the short border, so that a portion, close to the central position, of the short border fits in with the back plate 21 but there are gaps between the back plate and portions, close to the two ends, of the short border. When the first connection members 14 are engaged with the second connection members 22 disposed on the back plate 21, the long border 11 is elastically deformed. In this case, as shown in FIG. 6, the long border 11 is aligned with the long side of the rectangular back plate 21. In other words, the long border 11 is converted from the origin arc-shaped structure into a straight line-shaped structure and fits in with the long side of the back plate 21. When the first connection members 15 of the two borders 12, 13 are respectively engaged with the second connection members 23 disposed on the back plate 21, each of the short borders is elastically deformed. In this case, as shown in FIG. 6, the short borders are aligned with the two short sides of the rectangular back plate 21. In other words, the short borders 12, 13 are converted from the origin arc-shaped structure into a straight line-shaped structure and fit in with the short sides of the back plate 21.

In embodiments of the present disclosure, the first connection members 14 and 15 may be protrusions and the second connection members 22 and 23 may be recesses into which the protrusions can be fitted, or the second connection members 22 and 23 may be protrusions and the first connection members 14 and 15 may be recesses into which the protrusions can be fitted. Of course, the first connection members 14 and 15 and the second connection members 22 and 23 may also be any other known interconnectable devices for those skilled in the art.

During a process of assembling components (for example including the reflector plate, the light guide plate and the optical film) of the backlight source, all of the long border 11 and the two short borders 12, 13 receive forces (as shown by the arrows in FIG. 5) directed towards the back plate 21. Accordingly, the long border 11 and the two short borders 12, 13 are elastically deformed to fit in with the back plate 21. With the help of these forces, the components of the backlight source can be firmly fixed by the frame. In addition, the plurality of first connection members (in the embodiments, the long border and the short borders are each provided with three first connection members) of the frame are engaged with the second connection members of the back plate 21, respectively. Accordingly, stability of connection between the frame and the back plate 21 can be ensured. According to the embodiments of the present disclosure, the number of the connection members can be reduced while achieving the same effect as that in the prior art, so that structure can be simplified and assembly time and disassembly time can be saved. As a result, not only assembly efficiency can be improved and processing difficulty can be decreased, but also a glass screen can be effectively prevented from being locally broken due to failure of engagement or disengagement.

In accordance with embodiments of the present disclosure, the first arc-shaped structure of the long border 11 is symmetrical about a center of the long border 11. In this way, after the frame is engaged with the back plate 21, uniform forces can be exerted between the long border 11 and the back plate 21 so as to facilitate stable connection between the back plate 21 and the frame.

In this embodiment, referring to FIGS. 2 and 5, second arc-shaped structure of each of the short borders 12, 13 may be divided into a middle segment 31 and edge segments 32 located on two sides of the middle segment 31. The middle segment 31 is in a substantially straight-line shape, and the edge segments 32 are bent inwards relative to the middle segment 31. Specifically, as shown in FIGS. 2 and 5, the middle segment 31 of each of the short borders 12, 13 is in the substantially straight-line shape so as to be capable of fitting in with the back plate 21, while the edge segments 32 of each of the short borders 12, 13 are bent inwards relative to the middle segment 31 so that there is a gap between the back plate 21 and each of the short borders. In accordance with embodiments of the present disclosure, the second arc-shaped structure of each of the short borders 12, 13 is symmetrical about a center of the each of the short borders. In this way, after the frame is engaged with the back plate 21, uniform forces can be exerted between the short borders 12, 13 and the back plate 21 so as to facilitate the stable connection between the back plate 21 and the frame.

In accordance with embodiments of the present disclosure, referring to FIGS. 2-3 and 5, an included angle $\alpha$ formed between the middle segment 31 and the inwards bent edge segment 32 of the second arc-shaped structure of each of the short borders 12, 13 is about 170-175 degrees. An included angle $\beta$ at the inwards bent central position of the first arc-shaped structure of the long border 11 is about 160-170 degrees.

In accordance with embodiments of the present disclosure, in order to achieve a stabler fixation effect, the three first connection members 14 disposed on the long border 11 are distributed uniformly in a length direction of the long border 11; and likewise, the three first connection members 15 disposed on each of the short borders 12, 13 are distributed uniformly in a length direction of the each of the short borders.

In this embodiment, referring to FIGS. 2 and 5, a boss 36 is disposed on each of the long border 11 and the two short borders 12, 13 for fixation of a component of the backlight source.

As another technical solution, the disclosure also provides a backlight source comprising: a rectangular back plate, and a frame provided by the embodiments of the present disclosure and configured for fixation of a component (for example including a reflector plate, a light guide plate and an optical film) of the backlight source to the rectangular back plate.

The component of the backlight source comprises the reflector plate, the light guide plate and the optical film disposed in sequence in an inner chamber of the rectangular back plate. Of course, in practical applications, the backlight source may also include other components according to requirements.

The abovementioned frame is used in the backlight source provided by the embodiments of the present disclosure, so that, with the backlight source, a structure can be simplified and assembly time and disassembly time can be saved. As a result, not only assembly efficiency can be improved and processing difficulty can be decreased, but also a yield can be increased.

The present disclosure provides a frame and a backlight source comprising the frame. Thereby a structure of the frame can be simplified and its assembly time and disassembly time can be saved. As a result, not only assembly efficiency can be improved while processing difficulty can be decreased, but also a glass screen can be effectively prevented from being locally broken due to failure of engagement or disengagement.

The frame provided by the present disclosure has one long border and two short borders, the long border has the first arc-shaped structure configured such that the central position of the long border is bent inwards, each of the short borders has the second arc-shaped structure configured such that the two end positions of the each of the short borders is bent inwards, and the first connection members for engagement with the rectangular back plate are disposed at the central position, and the positions, close to the two ends, of the long border, and at the central position, and the positions, close to the two ends, of each of the short borders. Therefore, in a process of assembling components (for example including the reflector plate, the light guide plate and the optical film) of the backlight source, the long border and the two short borders can receive forces directed towards the back plate. With the help of these forces, the long border and the two short borders can be elastically deformed to fit in with the back plate while the components of the backlight source can be firmly fixed. Furthermore, compared with the prior art, the frame provided by the present disclosure can reduce the number of the connection members, as well as ensuring stability of the connection between the frame and the rectangular back plate while achieving the same effect as that in the prior art, so that a structure can be simplified and assembly time and disassembly time can be saved. As a result, not only assembly efficiency can be improved and processing difficulty can be decreased, but also a glass screen can be effectively prevented from being locally broken due to failure of engagement or disengagement.

The frame having the abovementioned configuration is used in the backlight source provided by the present disclosure, so that, regarding the backlight source, a structure can be simplified and assembly time and disassembly time can be saved. As a result, not only assembly efficiency can be improved and processing difficulty can be decreased, but also a yield can be increased.

It should be appreciated that the above embodiments are only exemplary ones for explaining principles of the present disclosure. However, the disclosure is not limited to the embodiments. Those skilled in the art may make various changes and modifications to the embodiments without departing from the spirit and principles of the disclosure, and these changes and modifications also fall within the protection scope of the disclosure.

What is claimed is:

1. A frame for fixation of a component of a backlight source to a rectangular back plate, comprising:

a long border and short borders located on two sides of the long border, wherein the long border and the two short borders correspond to a long side and two short sides of the rectangular back plate, respectively;

the long border has a first arc-shaped structure configured such that a central position of the long border is bent inwards relative to two ends of the long border;

each of the short borders has a second arc-shaped structure configured such that two ends of the each of the short borders are bent inwards relative to a central position of the each of the short borders; and a plurality of first connection members for engagement with the rectangular back plate are disposed at the central position of the long border, and positions, close to the two ends, of the long border, respectively, and a plurality of second connection members for engagement with the rectangular back plate are disposed at the central position of each of the short borders, and positions, close to the two ends, of the each of the short borders, respectively.

2. The frame of claim 1, wherein:

the first arc-shaped structure of the long border is symmetrical about a center of the long border.

3. The frame of claim 1, wherein:

the second arc-shaped structure of each of the short borders is divided into a middle segment and edge segments located on two sides of the middle segment;

the middle segment is in a straight-line shape; and the edge segments are bent inwards relative to the middle segment.

4. The frame of claim 3, wherein:

the second arc-shaped structure of each of the short borders is symmetrical about a center of the each of the short borders.

5. The frame of claim 3, wherein:

an included angle formed between the middle segment and the inwards bent edge segment is 170-175 degrees.

6. The frame of claim 1, wherein:

an included angle formed at the inwards bent central position of the long border is 160-170 degrees.

7. The frame of claim 1, wherein:

the plurality of first connection members on the long border comprise three first connection members distributed uniformly in a length direction of the long border; and the plurality of second connection members on each of the short borders comprise three second connection members distributed uniformly in a length direction of the each of the short borders.

8. The frame of claim 1, further comprising:

a first boss disposed on an inner edge of the long border and configured to fix the component of the backlight source, and a second boss disposed on an inner edge of each of the two short borders and configured to fix the component of the backlight source.

9. A backlight source comprising:

a rectangular back plate; and the frame according to claim 1, wherein a component of the backlight source is fixed to the rectangular back plate by the frame.

10. The backlight source of claim 9, wherein:

the component of the backlight source comprises a reflector plate, a light guide plate and an optical film disposed in sequence in an inner chamber of the rectangular back plate.

* * * * *